United States Patent
Heiskanen et al.

(10) Patent No.: US 11,155,698 B2
(45) Date of Patent: Oct. 26, 2021

(54) METHOD FOR THE PRODUCTION OF A FILM COMPRISING MICROFIBRILLATED CELLULOSE AND A FILM COMPRISING MICROFIBRILLATED CELLULOSE

(71) Applicant: Stora Enso OYJ, Helsinki (FI)

(72) Inventors: Isto Heiskanen, Imatra (FI); Esa Saukkonen, Lappeenranta (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 76 days.

(21) Appl. No.: 16/314,592

(22) PCT Filed: Jun. 27, 2017

(86) PCT No.: PCT/IB2017/053820
§ 371 (c)(1),
(2) Date: Dec. 31, 2018

(87) PCT Pub. No.: WO2018/002815
PCT Pub. Date: Jan. 4, 2018

(65) Prior Publication Data
US 2019/0248988 A1    Aug. 15, 2019

(30) Foreign Application Priority Data
Jul. 1, 2016   (SE) .................................... 1650962-2

(51) Int. Cl.
| | | |
|---|---|---|
| C08L 1/02 | (2006.01) | |
| D21H 11/18 | (2006.01) | |
| C09D 101/02 | (2006.01) | |
| F26B 13/00 | (2006.01) | |
| D21F 11/00 | (2006.01) | |
| C08J 5/18 | (2006.01) | |
| C08K 5/00 | (2006.01) | |

(52) U.S. Cl.
CPC .  *C08L 1/02* (2013.01); *C08J 5/18* (2013.01); *C08K 5/0025* (2013.01); *C09D 101/02* (2013.01); *D21F 11/00* (2013.01); *D21H 11/18* (2013.01); *F26B 13/00* (2013.01); *C08J 2301/02* (2013.01); *C08L 2203/16* (2013.01); *C08L 2312/00* (2013.01)

(58) Field of Classification Search
CPC ..... C08L 1/02; C08L 2203/16; C08L 2312/00
See application file for complete search history.

(56) References Cited

U.S. PATENT DOCUMENTS

| | | | | |
|---|---|---|---|---|
| 4,986,882 A | * | 1/1991 | Mackey .................. | A61L 15/28 162/109 |
| 2010/0143681 A1 | | 6/2010 | Yano et al. | |
| 2011/0281487 A1 | * | 11/2011 | Mukai ..................... | B32B 27/12 442/335 |
| 2012/0132381 A1 | * | 5/2012 | Hentze ................... | D21H 11/16 162/149 |
| 2012/0298319 A1 | | 11/2012 | Fujiwara et al. | |
| 2013/0022827 A1 | | 1/2013 | Imai et al. | |
| 2015/0064573 A1 | | 3/2015 | Kaji et al. | |
| 2016/0177512 A1 | | 6/2016 | Kawahara et al. | |

FOREIGN PATENT DOCUMENTS

| | | |
|---|---|---|
| CA | 2961540 A1 | 3/2016 |
| JP | 2010167411 A | 8/2010 |
| WO | 20100073678 A1 | 7/2010 |
| WO | 2011070923 A1 | 6/2011 |
| WO | 2015008868 A1 | 7/2014 |
| WO | 2018002815 A1 | 1/2018 |

OTHER PUBLICATIONS

Osterberg ; Applied Material & Interfaces; 2013, 5, 4640-4647.*

* cited by examiner

*Primary Examiner* — Pancham Bakshi
(74) *Attorney, Agent, or Firm* — Greer, Burns & Crain, Ltd.

(57) ABSTRACT

The present invention relates to a method for the production of a film comprising microfibrillated cellulose, wherein the method comprises the steps of; providing a suspension comprising microfibrillated cellulose, applying the suspension on a substrate to form a fibrous web, wherein the web has a first and a second side, conducting the web to a contact drying equipment wherein the first side of said web is in direct contact with of the contact drying equipment at a temperature above 100° C. whereby the web is at least partly dried forming a film. The invention also relates to a film produced according to the method.

9 Claims, No Drawings

METHOD FOR THE PRODUCTION OF A FILM COMPRISING MICROFIBRILLATED CELLULOSE AND A FILM COMPRISING MICROFIBRILLATED CELLULOSE

This application is a U.S. National Phase under 35 U.S.C. § 371 of International Application No. PCT/IB2017/053820, filed Jun. 27, 2017, which claims priority under 35 U.S.C. §§ 119 and 365 to Swedish Application No. 1650962-2, filed Jul. 1, 2016.

TECHNICAL FIELD

The present invention relates to a method for producing a film comprising microfibrillated cellulose and a microfibrillated film produced according to the method.

BACKGROUND

Films comprising microfibrillated cellulose (MFC) has been known to have good strength and oxygen barrier properties. This is for example described by Syverud, "Strength and barrier properties of MFC films", Cellulose 2009 16:75-85 where MFC films with a basis weight of between 15-30 gsm was produced and the strength and barrier properties were investigated.

During production of MFC films it is not easy to dewater and produce the film at high speed due to the characteristics properties of microfibrillated cellulose. When MFC films are used as barriers, it is crucial that the films don't have any pinholes or other defects that negatively would affect the barrier properties. Thus, it is important that the surface of the MFC film is smooth.

Wet laid techniques can be used for the production of MFC films, i.e. dewatering a furnish comprising said MFC on a wire. This method has the disadvantage that the MFC films will have wire marks on the surfaces which will negatively affect the barrier properties as well as the optical properties, such as gloss or translucency, of the films. The film is thereafter wet pressed which also will create a rough structure on the surfaces of the films as well as the technique has major problems with shrinkage of the films during drying.

Calendering of the MFC films after production in conventional calenders in order to smoothen the surfaces using two or several hard nips has also been shown to be difficult due to the high density of the MFC films.

It is also possible to create smooth MFC films by using film casting methods, i.e. casting of the film on a plastic surface and then drying the film slowly. Casting methods have been shown to produce MFC films with very smooth surfaces with good barrier properties. However, the method is too slow and inefficient for production in commercial scale.

There is thus a need for a new method to create a MFC film with high smoothness and improved barrier and optical properties.

SUMMARY

It is an object of the present invention to provide a method for providing at least one side of a film comprising microfibrillated cellulose with improved barrier properties, which method eliminates or alleviates at least some of the disadvantages of the prior art methods.

The invention is defined by the appended independent claims. Embodiments are set forth in the appended dependent claims and in the following description.

The present invention relates to a method for the production of a film comprising microfibrillated cellulose, wherein the method comprises the steps of: providing a suspension comprising microfibrillated cellulose, applying the suspension on a substrate to form a fibrous web, wherein the web has a first and a second side, conducting the web to a contact drying equipment wherein the first side of said web is in direct contact with of the contact drying equipment at a temperature above 100° C. whereby the web is at least partly dried forming a film. It has surprisingly been found that it is possible to produce a MFC film with good barrier properties by conducting the web so that the first side of the web is in direct contact with the drying equipment.

The suspension comprises between 70 weight-% to 100 weight-% of microfibrillated cellulose based on total dry weight. Thus, the MFC film produced comprises high amount of MFC, preferably between 70-100% by weight of MFC, this relates to the amount of MFC in the film per se before eventual coating layers have been added.

The contact drying equipment used is preferably a Yankee drying cylinder, a metal belt equipment or a Condebelt drying equipment.

The suspension may also comprise a wet strength additive. By adding a wet strength agent to the suspension the wet strength of the film can be increased. Since the film is dried at high temperatures, there is no need to cure the film in order for the wet strength agent to reach is full strength enhancing potential.

The suspension may also comprise a crosslinking agent. By adding a crosslinking agent to the suspension the film will have improved barrier properties at high relative humidity (RH) values.

The method may further comprise the step of applying a surface size, foam coating or a dispersion coating comprising a polymer to the side of the film that has not been in direct contact with the contact drying equipment, i.e. to the second side of the film. By applying a surface size, a foam coating and/or a dispersion coating to the side of the film that has not been in contact with the contact drying equipment it is possible to improve e.g. the heat-sealing properties and/or water resistance or water and moisture barrier properties of the film. Above all, a MFC film that has different properties on its two sides can be produced.

The method may further comprise the step of applying a polymer layer to the side of the film that has not been in direct contact with the contact drying equipment, either through lamination of a polymer film or by extrusion coating of a polymer. By adding a polymer layer a film having e.g. heat-sealing properties and/or barrier properties can be produced at a low cost.

The method may further comprise the step of applying water and/or a chemical solution to the first side of the fibrous web prior to conducting the web to the contact drying equipment. By adding a water and/or chemical the adhesion of the first side of the web against the drying equipment is increased.

The present invention also relates to a film comprising microfibrillated cellulose obtained by the method described above.

The film preferably has a grammage below 40 gsm, preferably below 30 gsm. The film preferably has a density of above 700 kg/cm³. The film preferably has an Oxygen Transmission Rate (OTR) value (23° C., 50% Relative Humidity) below 100 cc/m²*day*atm according to ASTM D-3985. The film according to the present invention is preferably a thin translucent or transparent film, with a high density, high smoothness and good barrier properties.

DETAILED DESCRIPTION

It has surprisingly been found that it is possible to dry a MFC film by subjecting at least one side of the film, the first side, to contact drying using a contact drying equipment, such as a Yankee Cylinder, metal belt dryer equipment or a Condebelt drying equipment, at high temperatures for drying and improving the barrier properties of the film. The temperature of the contact drying equipment is above 100° C., preferably between 110-190° C. The first side of the MFC film will then be in direct contact with the contact drying equipment, e.g. in direct contact with the drying cylinder or drying belt of the equipment. It would have been expected that the use of a contact drying equipment at high temperatures, i.e. at temperatures above the boiling point of water, the water in the film would start to boil and due to the high density of a MFC film it was expected that the water would boil inside the film and destroy the barrier properties of the film, i.e. it would not be possible for the boiling water to "escape" from inside the MFC film. The optical properties, such as the gloss of the film, are also improved. This could be visually seen after drying the film in the contact drying equipment.

With film is meant a thin substrate with good gas, aroma or grease or oil barrier properties, preferably oxygen barrier properties. The film preferably has a basis weight of less than 40 g/m$^2$ and a density in the range from 700-1400 kg/m$^3$. The oxygen transmission rate (OTR) value of a film having a grammage of 30 g/m$^2$ at 23° C. and a relative humidity of 50%, is preferably below 30 cc/m$^2$*day*atm according to ASTM D-3985.

The fibrous web is formed by applying the suspension onto a substrate. The substrate may preferably be a porous wire. The fibrous web may be formed by subjecting the suspension onto a wire. The fibrous web may also be applied by casting the suspension onto the substrate. The substrate then may be a paper or paperboard substrate thus forming a paperboard or paper substrate coated with a MFC film. The substrate may also be a polymer or metal substrate. It is thus possible to add a MFC film onto a polymer film. The casted fibrous web can then be dried and optionally peeled off from the substrate. If a multilayer structure comprising the fibrous web and the substrate is produced, the added fibrous web is not peeled off from the substrate. The peeled off fibrous web or the multilayer structure comprising the fibrous web and the substrate is thereafter dried in the drying equipment according to the present invention.

The suspension comprises between 70 weight-% to 100 weight-% of microfibrillated cellulose based on total dry weight. Thus, the MFC film produced comprises high amount of MFC, preferably between 70-100% by weight of MFC, this relates to the amount of MFC in the film per se before eventual coating layers have been added. The microfibrillated cellulose of the suspension preferably has a Shopper-Riegler (SR) value above 90, preferably above 95. The Shopper-Riegler value can be obtained through the standard method defined in EN ISO 5267-1. The film may also comprise longer cellulosic fibers, either hardwood or softwood fibers, preferably kraft pulp softwood fibers. The film may also comprise other additives, such as pigments, carboxymethylcelluose (CMC), retention chemicals, starch etc.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils,: The morphological sequence of MFC components from a plant physiology and fibre technology point of view, Nanoscale research letters* 2011, 6: 417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt%) when dispersed in water. The cellulose fiber is preferably fibrillated to such an extent that the final specific surface area of the formed MFC is from about 1 to about 300 m$^2$/g, or more preferably 50-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemithermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

Yankee Cylinders are normally used for drying tissue papers that is a very porous material. The use of Yankee Cylinders and how the drying affects paper is well described by Walker, in the article "High temperature Yankee Hoods Save Energy and Improve Quality, P&P, July 2007. When using a Yankee Cylinder for drying products, the liquid in the products flows through the product towards the Yankee cylinder, i.e. towards the heat and the steam that is formed during the drying. The liquid of the product in our case also comprises microfibrils which leads to that an increased concentration of microfibrils is achieved on the smoothened surface of the MFC film. This further improves the smoothness of the surface of the film which leads to improved barrier properties as well as improved optical properties and transparency of the MFC film.

Metal belt drying equipment is normally used when drying paper or paperboard products. The metal belt drying equipment uses a smooth heated metal belt to dry the film where the film will be in direct contact with the heated metal belt. The metal drying equipment is very efficient due to the use of high temperature and good water removal. It was thus surprising that a metal belt drying equipment could be used when drying a film according to the invention, due to the high temperatures used, applied pressure etc. With a metal belt drying equipment it is also possible to dry both sides of the film at the same time.

Condebelt drying equipment is normally used when drying paper or paperboard products. The use of Condebelt drying process increases the drying rates significantly compared to conventional drying cylinders. The higher drying rates are achieved by higher contact temperatures, higher pressure applied between the hot surface and the product being dried. Thus, it was surprisingly found that it was possible to use a Condebelt drying equipment for drying a MFC film according to the present invention even though high temperatures and pressures are used in the Condebelt drying equipment. The first side of the web according to the present invention will then be in direct contact with the heated belt of the Condebelt drying equipment.

The contact time needed in the direct contact equipment depends on the temperature and the dry content of the web.

The dry content of the web conducted to the direct drying equipment is preferably between 20-80% by weight, more preferably between 20-60% by weight or between 30-50% by weight. The web formed on the substrate may thus be dried or dewatered in any conventional way, e.g. by pressing or conventional cylinder drying, by using vacuum and/or by the use of hot air, in order for it to have the appropriate dry content before it is being conducted to the direct drying equipment.

The dry content of the produced MFC film after being subjected to drying in the direct drying equipment is preferably above 70% by weight, even more preferably above 80% by weight, preferably between 85-97% by weight. The produced MFC film may also be dried in additional drying steps after being dried in the direct drying equipment. Any conventional drying equipment may be used.

By only subjecting one side of the web in direct contact with the contact drying equipment a MFC film having two sides with different properties is achieved. The first side of the web is in direct contact with the contact drying equipment wherein the second side of the web is not in direct contact with the contact drying equipment. Said film has thus a first and a second side corresponding to said first and second side of the web. Thus, the first side of the film has been in direct contact with the contact drying equipment making the first side of the MFC film to be very smooth both due to the direct contact which smoothens the surface of the first side but also due to the increased concentration of the fibrils on the surface. The second side of the MFC film has not been in direct contact and it thus much coarser compared to the first side of the MFC film. Thus, the MFC film produced by the present methods produced a MFC with one very smooth surface and one coarser surface. The coarser second side of the MFC film is very suitable for further treatments, e.g. addition of coating layers or polymer layers. However, it might also be possible to coat the first more smooth side of the film.

The fibrous suspension may also comprise a wet strength agent, i.e. a wet strength agent may be added to the suspension. It has surprisingly been found that it is possible to dry a MFC film comprising a wet strength agent with a direct drying equipment at high temperatures. Wet strength chemicals improves the strength properties of the web and thus of the film by crosslinking the microfibrillated fibers and it was surprising that it was possible to produce a dry film comprising wet strength agents and MFC by the use of a contact drying equipment at high temperatures. Different wet strength agents can be added such as ureaformaldehyde (UH), melamineformaldehyde (MF), polyamide-epichlorohydrin (PEA), glyoxal and/or polyacrylamide (PAM), or mixtures thereof.

The suspension may also comprise a crosslinking agent. By adding a crosslinking agent to the suspension the film will have improved barrier properties at high relative humidity (RH) values. Different crosslinking agents can be added such as citric acid, polyisocyanate, metal ions preferably alkaline earth metal ions, anionic-cationic complex and/or polyelectrolye complex.

Normally when adding a wet strength agent or a crosslinking agent to a furnish to produce e.g. a paper, the paper needs to be cured in order for the wet strength agent or crosslinking agent to reach its full strength potential. When producing films the drying temperature is normally very low (to reduce over drying) and thus the film then needs to be cured in order for wet strength agent or crosslinking agent to fulfil its full potential. By the present invention there is no need to cure the film after drying since the wet strength agent or crosslinking agent will be cured during the drying of the film. The wet strength agent or crosslinking agent can be added to the furnish or added onto the wet film e.g. to the film on the substrate or in a surface treatment step of the film.

The method according to the invention may further comprise the step of applying a surface size, a foam coating and/or a dispersion coating comprising a polymer to one side of the film, preferably to the second side of the film. The applied coatings, e.g. surface size, foam coating or dispersion coating makes it possible to produce a MFC film with improved barrier properties. The film comprising a surface size, a foam coating or a dispersion coating can have improved heat-sealing properties and/or water resistance and moisture barrier properties. The polymer of the surface size, foam coating or dispersion coating is preferably a thermoplastic polymer such as polyethylene (PE), ethylene copolymers, acrylate based binders such as methacrylate based binders, styrene based binders e.g. styrene-olefin copolymers, vinyl based binders, e.g. PVC. The coating may also comprise additives that will further improve the heat sealability properties. Example of additives in the coating are waxes, antislip agents (e.g. PE waxes, carnauba waxes), inorganic fillers or pigments for antiblock, for haptic/optical, for viscosity control e.g. silica, talc, PCC, anti-oxidants, UV stabilizers, optical brightening agents (OBA), antifoaming agents and/or adhesion promoters. The coating is preferably added in a single step to form a single layer coating but it could also be added in more than one layer to form a multi-layer coating.

The method according to the invention may further comprise the step of applying a polymer layer to the side of the film that has not been in direct contact with the contact drying equipment, either through lamination of a polymer film or by extrusion coating of a polymer. The addition of a polymer layer makes it possible to produce a MFC film with good barrier properties with heat-sealing properties at a low cost. The polymer is preferably a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. By using for instance PLA as the thermoplastic polymer the product may be formed completely from biodegradable materials.

It may also be possible to apply water and/or a chemical solution to the first side of the fibrous web prior to conducting the web to the contact drying equipment. By adding water or a chemical solution to the first side of the web the adhesion between the first side of the web and a surface of the direct drying equipment is increased making the web to stick to the surface of the direct drying equipment and thus improving the drying. The chemical solution used may be resin based chemicals etc. This is especially important if a Yankee cylinder is used.

According to one embodiment the production speed through the direct drying equipment is about 100 m/min.

The present invention also relates to a film comprising microfibrillated cellulose obtained by the method describes above.

The MFC film preferably has a grammage below 40 gsm, preferably below 30 gsm. It is preferred that the grammage of the film is between 10-40 gsm, even more preferably between 10-30 gsm.

The density of the film is above preferably above 700 g/m$^3$, preferably between 700-1400 g/m$^3$. It is surprising that it is possible to dry a MFC film with such high density using high temperatures in a direct drying equipment.

The film preferably has an Oxygen Transmission Rate (OTR) value (23° C., 50% RH) below 100 cc/m$^2$*day*atm according to ASTM D-3985. Thus, the MFC film produced has very good oxygen barrier properties.

The MFC film according to the present invention may be used as bag in boxes when packaging dry food such as cereals, as a wrapping substrate, as a laminate material in paper, paperboard or plastics and/or as a substrate for disposable electronics.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for the production of a film comprising microfibrillated cellulose, wherein the method comprises the steps of:
   providing a suspension comprising microfibrillated cellulose wherein the suspension comprises between 70 weight-% to 100 weight-% of microfibrillated cellulose based on the total dry weight of the film,
   applying the suspension on a porous wire to form a fibrous web, wherein the fibrous web has a first and a second side, and,
   conducting the fibrous web to a contact drying equipment having a heated surface wherein only the first side of said fibrous web is in direct contact with the heated surface of the contact drying equipment at a temperature above 100° C. and the second side of the fibrous web is not in direct contact with the heated surface of the contact drying equipment whereby the fibrous web is at least partly dried forming a film with a second side of the film is coarser compared to a first side of the film,
   wherein the film has a grammage below 40 gsm and a density above 700 kg/cm$^3$.

2. The method according to claim 1 wherein the contact drying equipment used is a Yankee drying cylinder, a metal belt dryer equipment or a Condebelt drying equipment.

3. The method according to claim 1 wherein the suspension also comprises a wet strength additive.

4. The method according to claim 1 wherein the suspension also comprises a crosslinking agent.

5. The method according to claim 1 wherein the method further comprises the step of applying a surface size, a foam coating and/or a dispersion coating comprising a polymer to the second side of the film that has not been in direct contact with the contact drying equipment.

6. The method according to claim 1 wherein the method further comprises the step of applying a polymer layer to the second side of the film that has not been in direct contact with the contact drying equipment, either through lamination of a polymer film or by extrusion coating of a polymer.

7. The method according claim 1 wherein the method further comprises the step of applying water and/or a chemical solution to the first side of the fibrous web prior to conducting the web to the contact drying equipment.

8. The process according to claim 1, wherein the film has a grammage below 30 gsm.

9. The process according to claim 1, wherein the film has an Oxygen Transmission Rate (OTR) value (23° C., 50% RH) below 100 cc/m$^2$*day*atm according to ASTM D-3985.

* * * * *